US012693043B2

(12) United States Patent　　(10) Patent No.:　US 12,693,043 B2
　Hu　　　　　　　　　　　　　　　　(45) Date of Patent:　　Jul. 28, 2026

(54) SOLAR ENERGY UTILIZATION DEVICE

(71) Applicant: BOLY MEDIA COMMUNICATIONS (SHENZHEN) CO., LTD., Shenzhen (CN)

(72) Inventor: Xiaoping Hu, Shenzhen (CN)

(73) Assignee: BOLY MEDIA COMMUNICATIONS (SHENZHEN) CO., LTD., Shenzhen (CN)

( * ) Notice: Subject to any disclaimer, the term of this patent is extended or adjusted under 35 U.S.C. 154(b) by 443 days.

(21) Appl. No.: 18/270,836

(22) PCT Filed: Jul. 20, 2021

(86) PCT No.: PCT/CN2021/107237
　　§ 371 (c)(1),
　　(2) Date: Jul. 4, 2023

(87) PCT Pub. No.: WO2022/148000
　　PCT Pub. Date: Jul. 14, 2022

(65) Prior Publication Data
　　US 2024/0068712 A1　　Feb. 29, 2024

(30) Foreign Application Priority Data
　　Jan. 7, 2021　(WO) ................ PCT/CN2021/070582

(51) Int. Cl.
　　*F24S 23/30*　　　　(2018.01)
　　*F24S 23/00*　　　　(2018.01)
　　　　　　(Continued)
(52) U.S. Cl.
　　CPC .............. *F24S 23/31* (2018.05); *F24S 23/10* (2018.05); *F24S 23/12* (2018.05); *F24S 23/77* (2018.05); *F24S 23/80* (2018.05); *H02S 40/22* (2014.12)

(58) Field of Classification Search
　　CPC ............. F24S 23/10; F24S 23/12; F24S 23/77
　　　　　　(Continued)

(56) References Cited

U.S. PATENT DOCUMENTS 4,505,260 A * 3/1985 Metzger .................. F24S 23/30
　　　　　　　　　　　　　　　　　126/637
5,255,666 A * 10/1993 Curchod ................. F24S 50/20
　　　　　　　　　　　　　　　　　136/246

(Continued)

FOREIGN PATENT DOCUMENTS

CN　　　101087112 A　　12/2007
CN　　　106396224 A　　2/2017

OTHER PUBLICATIONS

International Search Report of PCT Patent Application No. PCT/CN2021/070582 issued on Sep. 15, 2021.

(Continued)

*Primary Examiner* — Vivek K Shirsat

(57)　　　　　　ABSTRACT

A solar energy utilization device, comprising a light energy utilization device (200) and a convex light concentrating device (100). The convex light concentrating device (100) is filled with a transparent liquid (130). The convex light concentrating device (100) has a light-transmissive convex sidewall (110) provided obliquely, and sunlight can be transmitted to the transparent liquid (130) from the light-transmissive convex sidewall (110). A first light energy utilization part (210) is provided at the bottom of an accommodating cavity, and sunlight transmitted from the transparent liquid (130) to the light-transmissive convex sidewall (110) forms a total internal reflection phenomenon, so that the convex light concentrating device (100) more conveniently concentrates the sunlight onto the first light energy utilization part (210).

8 Claims, 3 Drawing Sheets

(51) Int. Cl.
  *F24S 23/70*      (2018.01)
  *F24S 23/77*      (2018.01)
  *H02S 40/22*      (2014.01)

(58) Field of Classification Search
  USPC ........ 126/684, 698–700, 704–713, 705–707,
                     126/705–708, 637
  See application file for complete search history.

(56)                References Cited

U.S. PATENT DOCUMENTS

| | | | |
|---|---|---|---|
| 8,978,642 B2 * | 3/2015 | Stettenheim ............ | F24S 23/74 |
| | | | 126/684 |
| 2010/0108054 A1 * | 5/2010 | Ekhoff ................... | F24S 40/58 |
| | | | 126/714 |

OTHER PUBLICATIONS

International Search Report of PCT Patent Application No. PCT/CN2021/107237 issued on Oct. 20, 2021.

* cited by examiner

SOLAR ENERGY UTILIZATION DEVICE

TECHNICAL FIELD

The present disclosure relates to light energy conversion utilization devices.

BACKGROUND

Solar energy systems are increasingly used with the reduction of the cost of photovoltaic panels and the increase of efficiency. However, as solar energy systems become more widely used, problems arise, such as increased land costs, the cost of plant maintenance (including cleaning of dust and sweeping of ice and snow), and difficulty in recycling photovoltaic panels.

SUMMARY

The present disclosure mainly provides a new type of solar energy utilization device to demonstrate a new solar energy utilization structure.

Based on the above object, a solar energy utilization device is provided in an embodiment of the present disclosure, comprising:

a light energy utilization unit having a first light energy utilization part capable of receiving, converting and utilizing sunlight; and a convex light concentrating unit having a tilt light-transmissive convex sidewall capable of transmitting the sunlight to the solid lens or the transparent liquid, wherein the convex light concentrating unit is a solid lens or an accommodating cavity filled with a transparent liquid, the first light energy utilization part is arranged at the bottom of the convex light concentrating unit, the sunlight in the convex light concentrating unit transmitted from the solid lens or the transparent liquid to the light-transmissive convex sidewall forms a total reflection phenomenon such that the sunlight is concentrated onto the first light energy utilization part.

In an embodiment, the convex light concentrating unit may have a light-transparent bottom wall under which the first light energy utilization part is arranged.

In an embodiment, the first light energy utilization part may be connected to the light-transmissive convex sidewall, and form the bottom wall of the accommodating cavity.

In an embodiment, the convex light concentrating unit may be provided therein with a first light guide for guiding the sunlight to the first light energy utilization part.

In an embodiment, the first light guide may be a Fresnel lens arranged upright in the convex light concentrating unit.

In an embodiment, the Fresnel lens may be arranged vertically with respect to a light-receiving surface of the first light energy utilization part.

In an embodiment, the device may further include a second light guide arranged outside the convex light concentrating unit and configured for guiding the sunlight to the light-transmissive convex sidewall of the convex light concentrating unit.

In an embodiment, the second light guide may be a reflector arranged on one or both sides of the convex light concentrating unit, with a reflective surface of the reflector facing toward the convex light concentrating unit.

In an embodiment, the second light guide may be in fixed connection with the convex light concentrating unit or the light energy utilization unit, and the second light guide may be provided with a hanger for mounting the solar energy utilization device.

In an embodiment, the device may further include a closed container in which the light energy utilization unit and the convex light concentrating unit may be arranged, the closed container may be provided with a light-transmissive surface such that the sunlight can be directed from the light-transmissive surface into the convex light concentrating unit, and the closed container may be provided therein with a working medium which is in contact with the light energy utilization unit.

In an embodiment, the convex light concentrating unit is in communication with the closed container, the working medium may be the same transparent liquid as that in the convex light concentrating unit which is covered by the transparent liquid.

In an embodiment, the convex light concentrating unit may be closed, and the closed container may be provided with a first external interface for the working medium to enter and exit the closed container to utilize the working medium.

In an embodiment, the device may further comprises a third light guide provided with a holding chamber having a reflective side wall and a reflective bottom wall, the light energy utilization unit and the convex light concentrating unit may be arranged in the holding chamber, the light energy utilization unit may be provided with a second light energy utilization part that is arranged oppositely to the first light energy utilization part and is arranged toward the reflective bottom wall, and the reflective side wall and the reflective bottom wall may reflect part of the sunlight to the second light energy utilization part.

In an embodiment, the reflective bottom wall may be provided with a W-shaped reflecting surface.

In an embodiment, the third light guide may be provided with a light-transmissive top wall which, together with the reflective side wall and the reflective bottom wall, forms a sealed holding chamber.

In an embodiment, the device may further include a reflecting part and a support structure, the convex light concentrating unit and the light energy utilization unit may be arranged upright or inverted and supported by the support structure, the light energy utilization unit may be provided with a second light energy utilization part that is arranged oppositely to the first light energy utilization part, the reflecting part may be arranged below the convex light concentrating unit and the light energy utilization unit such that the sunlight may be reflected to the convex light concentrating unit and/or onto one of the second light energy utilization part and the first light energy utilization part.

In an embodiment, each light energy utilization unit may correspond to two convex light concentrating units. The two convex light concentrating units may be a first convex light concentrating unit and a second convex light concentrating unit, respectively, wherein the first convex light concentrating unit is arranged above the first light energy utilization part, and the second convex light concentrating unit is arranged below the second light energy utilization part.

In an embodiment, the reflecting part may be a Fresnel lens reflecting surface or a curved mirror. In an embodiment, the convex light concentrating unit may be a liquid lens, and the first convex light concentrating unit and/or the second convex light concentrating unit may be provided with a second external interface for the access of the transparent liquid.

In an embodiment, the device may further include a dust-proof unit in which the reflecting part, the support structure and the convex light concentrating unit may be arranged.

In an embodiment, the longitudinal cross-section of the convex light concentrating unit may be a polygon, and the number of sides of the polygon may be greater than or equal to three.

According to the above mentioned embodiments, the solar energy utilization device may include a light energy utilization unit and a convex light concentrating unit. The convex light concentrating unit may be a solid lens or a liquid lens filled with a transparent liquid. The convex light concentrating unit may be provided with a light-transmissive convex sidewall arranged obliquely, and sunlight can be transmitted from the light-transmissive convex sidewall into the solid lens or the transparent liquid. The first light energy utilization part is arranged at the bottom of the convex light concentrating unit, and the sunlight transmitted from the solid lens or the transparent liquid to the light-transmissive convex sidewall can form a total reflection phenomenon, so that the convex light concentrating unit can more conveniently concentrate the sunlight onto the first light energy utilization part, thereby preventing the sunlight from being refracted from the light-transmissive convex sidewall after being reflected by the inner wall of the convex light concentrating unit into the transparent liquid, so as to concentrate more sunlight onto the light energy utilization part and improve light concentrating efficiency. Total reflection can also generally improve the incidence angle of sunlight to the light energy utilization unit, thus reducing reflection loss.

DETAILED DESCRIPTION

Figure 1:
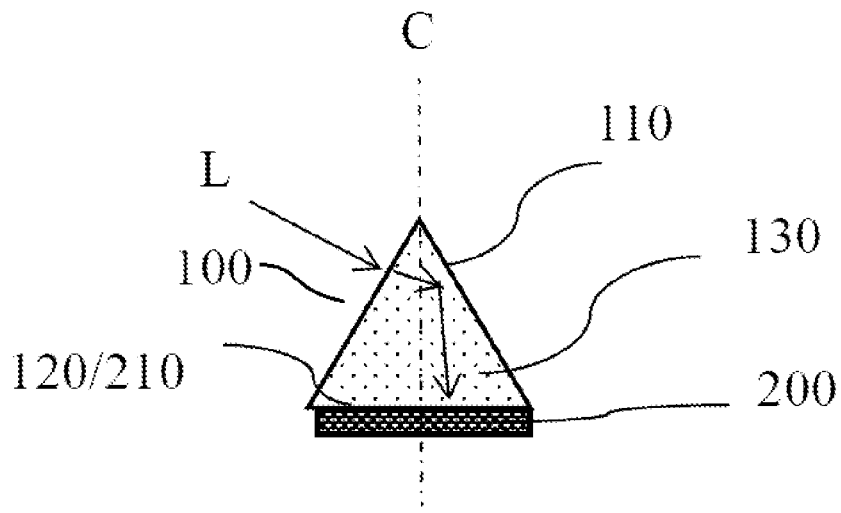
FIG. 1 is a schematic diagram of the longitudinal cross section of a solar energy utilization device in a first embodiment of the present disclosure.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

The upper and lower positional relationships herein are relative and do not have absolute significance.

A solar energy utilization device provided in an embodiment of the present disclosure can be configured for receiving and utilizing sunlight for energy conversion, converting the sunlight into electrical, thermal and other forms of energy for use.

The solar energy utilization device shown in the embodiment may include at least one light energy utilization unit and at least one convex light concentrating unit.

The light energy utilization unit may be provided with a first light energy utilization part capable of receiving, converting and utilizing sunlight. In an embodiment, the first light energy utilization part and other light energy utilization units (such as the second light energy utilization part mentioned below) may be one or more of a photovoltaic panel, a photothermal utilization device, a photoelectric and thermal energy comprehensive utilization device, and a concentrated light energy utilization unit. The photovoltaic panel may generally refer to any device that directly converts light energy into electrical energy, including various semiconductor photovoltaic panels, photovoltaic thin films, quantum dot optoelectronic converter devices, etc. In other embodiments, the first light energy utilization part may also be sunlight utilization and conversion structures in other forms.

The convex light concentrating unit may be provided with a solid lens or an accommodating activity filled with transparent liquid internally. The convex light concentrating unit may have a tilted light transmission convex sidewall, and sunlight can be transmitted from the light transmission convex sidewall to the convex light concentrating unit. The convex light concentrating unit with the tilted light-transmissive convex sidewall can adapt to incident light with larger deflection angles; thus it can be used not only to cope with the north-south regression deflection of sunlight, but also to cope with the east-west deflection of sunlight. In an embodiment, the light-transmissive convex sidewall may be composed of a plane, a folded surface, a curved surface, or a combination of the above surfaces.

The first light energy utilization part may be arranged at the bottom of the convex light concentrating unit, and the sunlight in the convex light concentrating unit transmitted from the solid lens or the transparent liquid to the light-transmissive convex sidewall may form a total reflection phenomenon to concentrate the sunlight onto the first light energy utilization part. The structure of the convex light concentrating unit may be configured such that the sunlight transmitted from the transparent liquid to the light-transmissive convex sidewall forms the total reflection (or total internal reflection) phenomenon, that is, the sunlight reflected into the transparent liquid will not or most of it will not be transmitted from the light-transmissive convex sidewall, instead, it may be continuously propagated within the convex light concentrating unit under total reflection and finally concentrated onto the first light energy utilization part.

In the embodiment, the light-transmissive convex sidewall may play a role in transmitting light as well as in total reflection. Compared with prior art, under the same conditions, the convex light concentrating unit is capable of concentrating more sunlight onto the first light energy utilization part, increasing the concentration ratio. Meanwhile, with respect to the light energy utilization unit, there is an improvement for the incident angle of the light being totally reflected; thereby decreasing the reflection loss of the light energy utilization unit and improving the efficiency of light energy utilization.

Further, the convex light concentrating unit may concentrate all or most of the income sunlight transmitted onto the light energy utilization unit. To receive such sunlight, the light energy utilization unit may be arranged on an outer side of the convex light concentrating unit, and the first light energy utilization part may be attached onto the convex light concentrating unit such that the sunlight in the convex light concentrating unit can be concentrated onto the first light energy utilization part. Alternatively, the first light energy utilization part may be directly arranged in the accommodating cavity; or, the first light energy utilization part may form part cavity wall of a light concentrating trough.

Specifically, in an embodiment, the convex light concentrating unit may be provided with a light-transparent bottom wall, the first light energy utilization part fits the outer side of the light-transparent bottom wall. For example, the first light energy utilization part may be fixedly connected to the outer side of the convex light concentrating unit. In the convex light concentrating unit, the sunlight may be concentrated onto the first light energy utilization part and entered into the first light energy utilization part.

In another embodiment, the convex light concentrating unit may be a liquid lens, and the light energy utilization unit may be directly soaked in the transparent liquid; in this way, the first light energy utilization part may directly receive the income sunlight transmitted from the transparent liquid.

In yet another embodiment, the first light energy utilization part may be a part of the convex light concentrating unit, and an outer wall of the first light energy utilization part (a side surface used for receiving sunlight) may be directly or indirectly connected to the light-transmissive convex sidewall to form a bottom wall of the accommodating cavity.

Part or all space in the convex light concentrating unit may be filled with transparent liquid. Preferably, the transparent liquid may sufficiently fill the entire accommodating cavity to obtain a better effect.

One or more convex light concentrating units may be used to concentrate light when utilizing such convex light concentrating unit. Correspondingly, the light energy utilization unit may be provided with one or more first light energy utilization parts or one or more light energy utilization unit so as to combine with the convex light concentrating unit for use. Alternatively, the light energy utilization unit may be the one with a built-in light condenser. For example, the light energy utilization unit may be provided on a single side or both sides with the first light energy utilization part.

In an embodiment, by using transparent glass or plastic, the convex light concentrating unit may be configured as a solid lens, or a transparent accommodating cavity which may be filled with transparent liquid internally. The transparent liquid may be purified water (water), an antifreeze liquid (a mixture of water and ethylene glycol), or other environmentally friendly transparent liquid (such as a mixture of water and glycerol).

In addition, the transparent liquid may also directly or indirectly form a heat transfer structure with the first light energy utilization part, thereby cooling or absorbing heat to the first light energy utilization part, and improving light energy utilization efficiency.

Based on the above inventive concept, several different embodiments are further described below to better illustrate the inventive concept.

Example 1

Referring to FIG. 1, a solar energy utilization device comprising a convex light concentrating unit 100 and a light energy utilization unit 200 is disclosed in this embodiment. The convex light concentrating unit 100 is a closed structure, forming a closed accommodating cavity filled with transparent liquid 130 internally. The accommodating cavity is provided with a light-transmissive convex sidewall 110 and a light-transparent bottom wall 120. The light energy utilization unit 200 is provided with a first light energy utilization part 210 (in the figure, the first light energy utilization part 210 is attached tightly to the light-transparent bottom wall 120, so they are labeled together) capable of receiving, converting and utilizing sunlight. The first light energy utilization part 210 is arranged at an outer side of the light-transparent bottom wall 120 and is attached tightly to the light-transparent bottom wall 120.

Of course, in other embodiments, the first light energy utilization part 210 of the light energy utilization unit 200 may serve as the bottom wall of the convex light concentrating unit 100, such that the light energy utilization unit 200 and the convex light concentrating unit 100 can form an integral structure.

FIG. 1 shows the process of incident light L being fully reflected by the light-transmissive convex sidewall 110 to the light energy utilization unit 200. This is one of the main differences between the present disclosure and other light condensers, which is to fully utilize the total reflection of the transparent liquid 130 in the convex light concentrating unit 100 to achieve light condensing. Meanwhile, the transparent liquid 130 may also be used to cool or absorb heat on the light energy utilization unit 200 to improve the light energy utilization efficiency of the light energy utilization unit 200. That is, the light-transmissive convex sidewall 110 has two functions at the same time: first transmitting incident light from the outside through one surface, and then fully reflecting light from the transparent liquid 130 through one surface.

Referring to FIG. 1, in this embodiment, the longitudinal cross section of the convex light concentrating unit 100 is a folded surface of a triangle. In other embodiments, a wall of the convex light concentrating unit 100 may also be a curved surface or a folded surface of other shapes, for example, the section is a folded surface of a quadrangle or a pentagon. The longitudinal cross-section of the convex light concentrating unit 100 may also be of other shapes raised upward.

Continue to refer to FIG. 1. In this embodiment, the convex light concentrating unit 200 is symmetrical along a center line C of the light energy utilization unit 200, and the light energy utilization unit is arranged in the center of the light-transparent bottom wall 120 of the convex light concentrating unit 100. In other embodiments, the convex light concentrating unit 100 may be asymmetric. In other embodiments, the light energy utilization unit 200 may also be arranged in a position where the light-transparent bottom wall 120 leans to one side and does not have to be arranged in the center of the light-transparent bottom wall 120.

Continue to refer to FIG. 1. In this embodiment, the size of the light-transparent bottom wall 120 is the same as the side of a light-receiving surface (i.e. a side receiving sunlight) of the first light energy utilization part 210. In other embodiments, the area of the light-transparent bottom wall 120 may be greater than or smaller than the light-receiving surface area of the first light energy utilization part 210.

Continue to refer to FIG. 1. In this embodiment, the light-transmissive convex sidewall 110 is a symmetrical structure (along the center line C of the light energy utilization unit); whereas in other embodiments, the light-transmissive convex sidewall 110 may be an asymmetric structure.

Example 2

Figure 2:
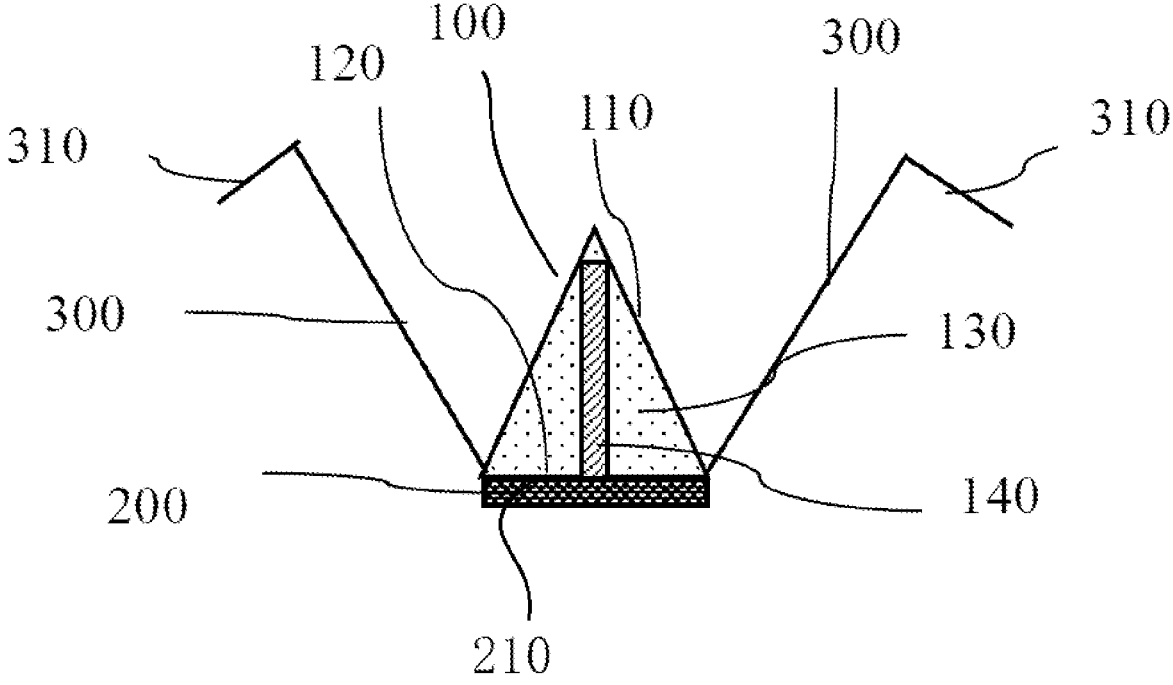
FIG. 2 is a schematic diagram of the longitudinal cross section of a solar energy utilization device in a second embodiment of the present disclosure.

Referring to FIG. 2, a solar energy utilization device comprising a convex light concentrating unit 100 and a light energy utilization unit 200 is disclosed in this embodiment.

One difference between the solar energy utilization device shown in this embodiment and that in Example 1 is that the convex light concentrating unit 100 is provided with a first light guide 140 internally. The first light guide 140 may guide sunlight towards to the first light energy utilization part 210 in a manner of, for example, refraction or reflection.

Referring to FIG. 2, in this embodiment, the first light guide 140 is a Fresnel lens that is basically perpendicular to the light-transparent bottom wall 120 and deflects the incident light in the direction of the light-transparent bottom wall 120. In an embodiment, the Fresnel lens may adopt a linear Fresnel lens, a double-sided Fresnel lens, or a double-sided linear Fresnel lens.

The vertically-arranged Fresnel lens may greatly enhance light deflection of the convex light concentrating unit 100 in the embodiment, so that it can be used to adapt to the east-west deflection of the sun and save the sun tracking system.

In addition, in other embodiments, the first light guide 140 may also be a reflecting part (e.g. a reflective Fresnel lens). The first light guide 140 may also be arranged in the convex light concentrating unit at other angles, such as tilting at a certain angle relative to the vertical direction.

On the other hand, continue to refer to FIG. 2. Another difference between the solar energy utilization device shown in this embodiment and that in Example 1 is that the solar energy utilization device further comprises a second light guide 300. The second light guide 300 is arranged on the outside of the convex light concentrating unit 100 for guiding sunlight towards the light-transmissive convex sidewall 110 of the convex light concentrating unit 100.

Continue to refer to FIG. 2. In this embodiment, the second light guide 300 is a reflector arranged on one or both sides of the convex light concentrating unit 100; and the reflective surface of the reflector faces towards the convex light concentrating unit 100 so as to reflect sunlight to the convex light concentrating unit 100. In FIG. 2, the two second light guides 300 form an opening structure that is larger at the top and smaller at the bottom, so that more sunlight can transmit from the opening into the opening structure, thereby concentrating more sunlight.

In other embodiments, the guiding mode adopted may be reflected or transmitted.

Further, please refer to FIG. 2. In this embodiment, the second light guide 300 is fixed connected with the convex light concentrating unit 100 or the light energy utilization unit; and the second light guide 300 is provided with a hanger 310 for mounting the solar energy utilization device. For example, the entire solar energy utilization device can be hung on another object or another solar energy utilization device by the hanger 310.

Example 3

Figure 3:
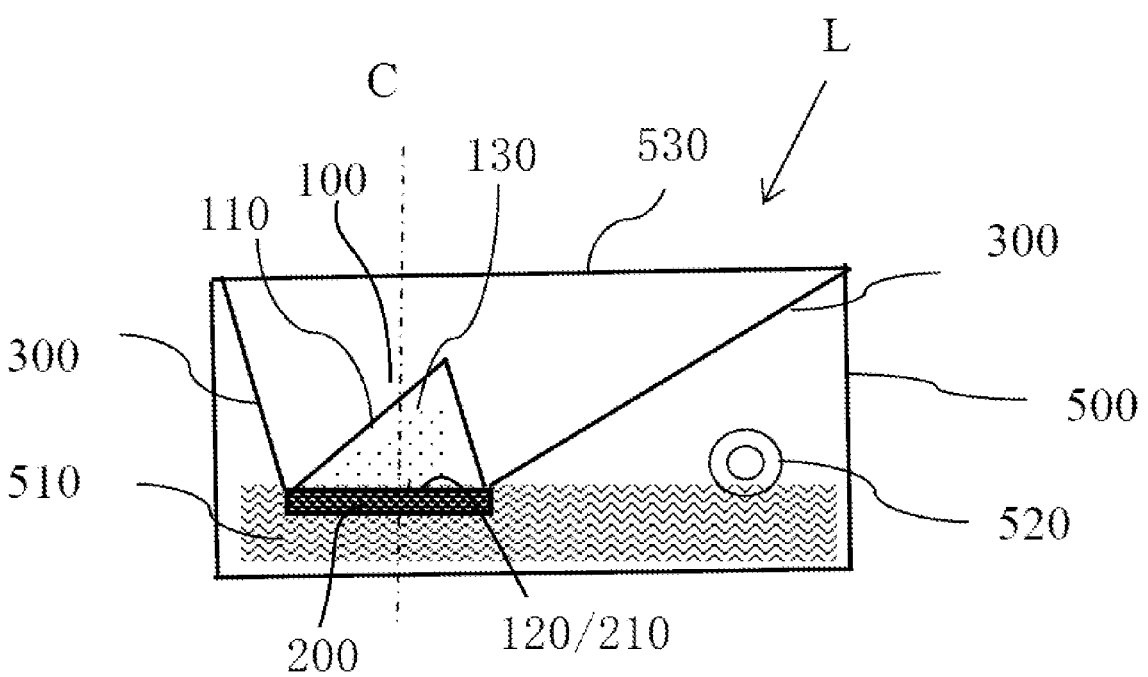
FIG. 3 is a schematic diagram of the longitudinal cross section of a solar energy utilization device in a third embodiment of the present disclosure, which can be installed in a lying manner in a high latitude area.

Please referring to FIG. 3, a solar energy utilization device including a convex light concentrating unit 100 and a light energy utilization unit 200 is disclosed in this embodiment. Further, the solar energy utilization device also includes a closed container 500 in which the convex light concentrating unit 100 and the light energy utilization unit 200 are arranged. The closed container 500 can protest the convex light concentrating unit 100 and the light energy utilization unit 200 from such as dust and water. The closed container 500 is provided with a light-transmissive surface 530 made of light-transmissive material so that sunlight can transmit from the light-transmissive surface 530 into the convex light concentrating unit 100. The light-transmissive surface 530 can be either the top side of the closed container, or one or multiple sides of the closed container 500. The closed container 500 may contain working medium 510, which is in contact with the light energy utilization unit 200 to dissipate and cool the light energy utilization unit 200 to use the heat.

In an embodiment, the convex light concentrating unit 100 is an accommodating cavity filled with transparent liquid and communicated with the closed container 500. For example, the accommodating cavity is communicated with the closed container 500 from the bottom or side of the convex light concentrating unit 100. The working medium 510 is the same transparent liquid 130 as that in the convex light concentrating unit 100, so that the transparent liquid 130 can flow between the cavity of the closed container 500 and the convex light concentrating unit 100. In an embodiment, the transparent liquid 130 is capable of covering the convex light concentrating unit 100 with a liquid level higher than the convex light concentrating unit 100, enabling the convex light concentrating unit 100 to be filled with the transparent liquid 130 and preventing the loss of fluid in the convex light concentrating unit 100.

In another embodiment, the convex light concentrating unit 100 may be a solid lens. In this case, the closed container 500 can store the working medium 510, for example, air, water, or other liquids. At the same time, the closed container 500 may be provided with a first external interface 520 so as to connect with an external pipeline for the working medium 510 to enter and exit the closed container 500 to use the working medium 510 for other applications, such as thermal cycling with the outside, to generate electricity and provide hot water at the same time.

Further, please referring to FIG. 3, the embodiment shows the convex light concentrating unit 100 and the light-transmissive convex sidewall 110 that exhibit an asymmetric structure through the center line C relative to the light energy utilization unit 200 to deal with the directional deviation of sunlight. The device according to this embodiment may be installed in a lying manner at high latitudes.

Of course, the convex light concentrating unit 100 or the light-transmissive convex sidewall 110 may also be designed to be symmetrical relative to the center line C of the light energy utilization unit 200.

Further, please referring to FIG. 2, the convex light concentrating unit 100 may also be provided internally with the first light guide 140 which can guide sunlight to the first light energy utilization part 210 in a manner of such as refraction or reflection.

Further, please referring to FIG. 3, the solar energy utilization device may also include the second light guide 300 which is arranged on the outside of the convex light concentrating unit 100 and in the closed container 500. The second light guide 300 may be configured to guide the sunlight to the light-transmissive convex sidewall 110 of the convex light concentrating unit 100.

Example 4

Figure 4:
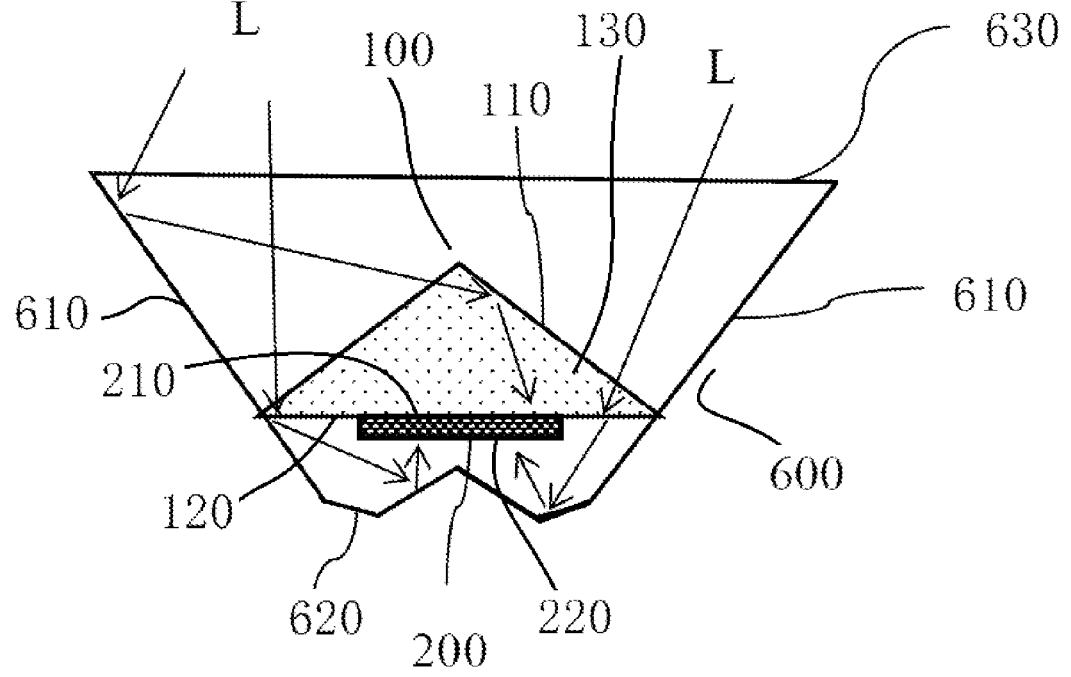
FIG. 4 is a schematic diagram of the longitudinal cross section of a solar energy utilization device in a fourth embodiment of the present disclosure, which shows a double-sided light-gathering structure.

Please referring to FIG. 4, a solar energy utilization device including a convex light concentrating unit 100 and a light energy utilization unit 200 is disclosed in this embodiment. Further, the solar energy utilization device may also include a third light guide 600 having a holding chamber. The holding chamber may have a reflective side wall 610 and a reflective bottom wall 620. The convex light concentrating unit 100 and the light energy utilization unit 200 are arranged in the holding chamber. The light energy utilization unit 200 may be provided with a second light energy utilization part 220 that is opposite to the first light energy utilization part 210. The second light energy utilization part 220 faces toward the reflective bottom wall 620. The reflective side wall 610 and the reflective bottom wall 620 reflect part of the sunlight to the second light energy utilization part 220. The reflective side wall 610 and the reflective bottom wall 620 may be made of various materials and structures capable of reflecting light, such as a reflector or a reflective Fresnel lens surface.

Please referring to FIG. 4, in an embodiment, the first light energy utilization part 210 of the light energy utilization unit 200 is arranged upwards, and the second light energy utilization part is arranged downwards. The reflective side wall 610 can reflect some of the sunlight to the convex light concentrating unit 100. Part of the sunlight may enter below the second light energy utilization part 220 and then be reflected onto the second light energy utilization part 220 by the reflective side wall 610 and the reflective bottom wall 620.

Continue to refer to FIG. 4. In order to better reflect sunlight onto the second light energy utilization part 220, the reflective bottom wall 620 may have a W-shaped reflecting surface in an embodiment. Of course, the reflective bottom wall 620 may also be in other shapes, such as a V-shaped or U-shaped shape. In this embodiment, the reflective bottom wall 620 is a simple W-shaped reflecting surface. In other embodiments, this W-shaped reflecting surface may also be replaced by a reflective Fresnel lens surface.

In another embodiment, please referring to FIG. 4, the third light guide 600 may have a light-transmissive top wall 630. The light-transmissive top wall 630, the reflective side wall 610 and the reflective bottom wall 620 form a sealed holding chamber, thus enabling the third light guide 600 to protect the convex light concentrating unit 100 and the light energy utilization unit 200 from such as dust and water.

Further, the area of the light-transparent bottom wall 120 may be the same as or different from the area of the light-receiving surface of the first light energy utilization part 210. Please referring to FIG. 4, the area of the light-transparent bottom wall 120 is larger than the area of the light-receiving surface of the second light energy utilization part 220; in this way, the sunlight entering the part from the transparent liquid can enter the space below the second light energy utilization part 220, so that the sunlight may be, after reflected by the reflective bottom wall 620, reflected to the second light energy utilization part 220 to increase the sunlight incoming to the second light energy utilization part 220.

The solar energy utilization device shown in this embodiment has two light energy utilization parts 210, 220 and the third light guide 600, which can further improve light concentrating efficiency and also facilitate the compactness of the solar energy utilization device.

Example 5

Figure 5:
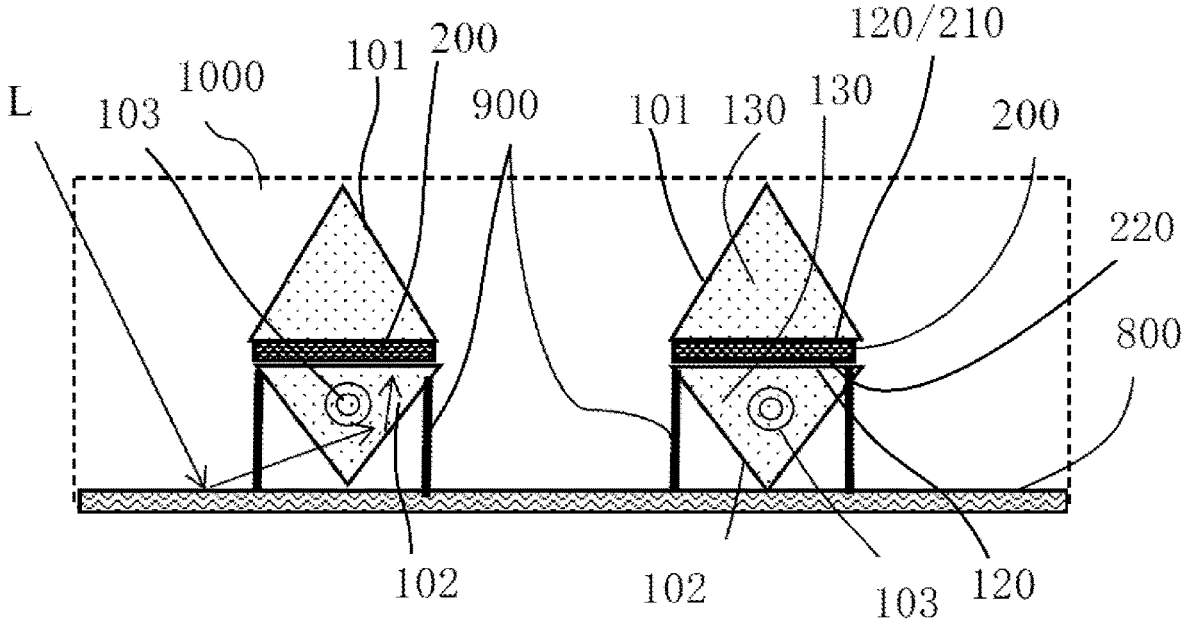
FIG. 5 is a schematic diagram of the longitudinal cross section of a solar energy utilization device in a fifth embodiment of the present disclosure, which shows an array type double-sided light-gathering structure.

Please referring to FIG. 5, a solar energy utilization device including a convex light concentrating unit 100 and a light energy utilization unit 200 is disclosed in this embodiment. Further, the solar energy utilization device may also include a reflecting part 800 and a support structure 900.

There are two convex light concentrating units 100, that is a first convex light concentrating unit 101 and a second convex light concentrating unit 102, respectively. The light energy utilization unit 200 has a second light energy utilization part 220 that is arranged oppositely to a first light energy utilization part 210. The first convex light concentrating unit 101 is arranged above the first light energy utilization part 210, and the second convex light concentrating unit 102 is arranged under the second light energy utilization part 220. The first convex light concentrating unit 101, the second convex light concentrating unit 102 and the light energy utilization unit 200 are mounted on the support structure 900. The reflecting part 800 is arranged under the second convex light concentrating unit 102 and the light energy utilization unit 200 so as to reflect sunlight onto the second convex light concentrating unit 102 and/or the second light energy utilization part 220. In this embodiment, the second convex light concentrating unit 102 is a liquid lens, in which the transparent liquid 130 is provided. The reflecting part 800 may adopt various structures that can achieve sunlight reflection, such as U-shaped mirrors or reflective Fresnel lenses.

Specifically, referring to FIG. 5 which shows the process of the reflecting part 800 at the bottom reflecting the sunlight to the second convex light concentrating unit 102, an array structure is shown in this embodiment, wherein L represents sunlight. The total reflection phenomenon may also be generated similarly in the second convex light concentrating unit 102. The sunlight transmitted from the light-transmissive convex sidewall 110 of the second convex light concentrating unit 102 into the transparent liquid 130 in the second convex light concentrating unit 102 can also be fully reflected when it is transmitted to the light-transmissive convex sidewall 110 and finally be concentrated onto the second light energy utilization part 220. The second light energy utilization part 220 may also be arranged on the outside of the light-transparent bottom wall 120 of the second convex light concentrating unit 102. Alternatively, it may be served as the bottom wall of the second convex light concentrating unit 102 to form an integral structure with the second convex light concentrating unit 102.

Referring to FIG. 5, in an embodiment, the first convex light concentrating unit 101 and/or the second convex light concentrating unit 102 are provided with a second external interface 103, which may be connected to an external pipeline for the inlet and outlet of the transparent liquid 130, thereby applying the transparent liquid 130, such as conducting heat exchange with an external thermal circulation system, and fully utilizing the heat energy obtained by transparent liquid 130.

The reflecting part may also be used in conjunction with a single convex light concentrating unit. Please referring to FIG. 5, in an embodiment, the second convex light concentrating unit 102 can be removed, and the first convex light concentrating unit 101 can only be arranged on the light energy utilization unit 200 having the first light energy utilization part 210 and the second light energy utilization part 220. Such situation (the convex light concentrating unit 101 is arranged above the light energy utilization unit 200) may be referred to as an upright setting. In another embodiment, the first convex light concentrating unit 101 can be removed, and the second convex light concentrating unit 102 can only be arranged below the light energy utilization unit 200 having the first light energy utilization part 210 and the second light energy utilization part 220. Such situation (the light energy utilization unit 200 is arranged above the convex light concentrating unit 102) may be referred to as an inverted setting. The situation where there are convex light concentrating units 101, 102 on both sides of the light energy utilization unit 200 may be referred to as a bilateral setting. FIG. 5 shows the situation of the bilateral setting.

Further, please referring to FIG. 5, in an embodiment, the device may also include a dust-proof unit 1000 (such as a dust cover), in which the reflecting part 800, the support structure 900 and the convex light concentrating unit 100 are arranged in the dust-proof unit 1000 to facilitate cleaning.

Further, please referring to FIG. 5, in an embodiment, there are two or more groups of convex light concentrating units 100 and the light energy utilization units 200, which are used in groups. Different groups of the convex light concentrating units 100 and the light energy utilization units 200 can share the reflecting part 800 and the dust-proof unit 1000, or they can correspond to reflecting part 800 and dust-proof unit 1000, respectively.

The above specific examples are set forth to aid in understanding the present disclosure and are not intended to limit the present disclosure. Variations of those specific embodiments may become apparent to those skilled in the art in light of the teachings herein.

The invention claimed is:

1. A solar energy utilization device, comprising:
a light energy utilization unit having a first light energy utilization part which is basically flat and a second light energy utilization part arranged back to back with the first light energy utilization part, wherein the first and second light energy utilization parts are capable of receiving, converting and utilizing sunlight;
two convex light concentrating units, each being a solid lens or an accommodating cavity filled with a transparent liquid, wherein each of the two convex light concentrating units having a tilt light-transmissive convex sidewall capable of transmitting the sunlight to the solid lens or the transparent liquid and having a basically flat bottom, the first light energy utilization part fits the bottom of one of the two convex light concentrating units, the second light energy utilization part fits the bottom of the other convex light concentrating unit, the sunlight in any of the two convex light concentrating units transmitted from the solid lens or the transparent liquid to the light-transmissive convex sidewall forms a total reflection phenomenon such that the sunlight is concentrated onto the respective light energy utilization part;
further comprising a reflecting part and a support structure, wherein the two convex light concentrating units and the light energy utilization unit are supported by the support structure, the reflecting part is arranged below the two convex light concentrating units and the light energy utilization unit to allow the sunlight to be reflected to any of the two convex light concentrating units.

2. The solar energy utilization device according to claim 1, wherein each of the two convex light concentrating units has a light-transparent bottom wall, and the respective light energy utilization part fits the outer side of the light-transparent bottom wall, or
wherein the first or second light energy utilization part forms a bottom wall of the respective convex light concentrating unit.

3. The solar energy utilization device according to claim 1, wherein any of the two convex light concentrating units is provided therein with a light guide,
wherein the light guide is a Fresnel lens,
wherein the Fresnel lens is arranged vertically with respect to a light-receiving surface of the respective light energy utilization part.

4. The solar energy utilization device according to claim 1, further comprises: a light guide arranged on an outer side of any of the two convex light concentrating units and configured for guiding the sunlight to its light-transmissive convex sidewall.

5. The solar energy utilization device according to claim 4, wherein the light guide is a reflector arranged on one or both sides of any of the two convex light concentrating units, with a reflective surface of the reflector facing toward the convex light concentrating unit.

6. The solar energy utilization device according to claim 1, wherein the reflecting part is a Fresnel lens reflecting surface or a curved mirror.

7. The solar energy utilization device according to claim 1, wherein any of the two convex light concentrating units is provided with an external interface for the access of the transparent liquid.

8. The solar energy utilization device according to claim 1, wherein a longitudinal cross-section of each convex light concentrating unit is a polygon, and the number of sides of the polygon is greater or equal to three.

\* \* \* \* \*